(12) United States Patent
Berger et al.

(10) Patent No.: US 6,196,846 B1
(45) Date of Patent: Mar. 6, 2001

(54) SYSTEM AND METHOD FOR ESTABLISHING A DATA SESSION AND A VOICE SESSION FOR TRAINING A USER ON A COMPUTER PROGRAM

(75) Inventors: Michael A. Berger, Richardson; Andrew K. Overheu, Dallas, both of TX (US)

(73) Assignee: Virtual Village, Inc., Dallas, TX (US)

( * ) Notice: Subject to any disclaimer, the term of this patent is extended or adjusted under 35 U.S.C. 154(b) by 0 days.

(21) Appl. No.: 09/089,122

(22) Filed: Jun. 2, 1998

(51) Int. Cl.[7] .................................................. G09B 19/00
(52) U.S. Cl. ............................................................ 434/118
(58) Field of Search ..................... 434/330, 350, 434/362, 323, 365, 118; 463/41, 42; 340/825.52, 286.01, 286.02; 379/93.08

(56) References Cited

U.S. PATENT DOCUMENTS

| | | |
|---|---|---|
| 4,360,345 | 11/1982 | Hon . |
| 4,367,485 | 1/1983 | Hemmie . |
| 4,652,240 | 3/1987 | Wackym . |
| 4,715,818 | 12/1987 | Shapiro, et al. . |
| 5,033,969 | 7/1991 | Kamimura . |
| 5,437,555 | 8/1995 | Ziv-El . |
| 5,442,759 * | 8/1995 | Chiang et al. .................... 434/118 X |
| 5,458,494 * | 10/1995 | Khron et al. ..................... 434/350 X |
| 5,711,672 * | 1/1998 | Redford et al. .................. 434/365 X |
| 5,782,642 * | 7/1998 | Goren ............................... 434/350 X |
| 5,791,907 * | 8/1998 | Ramshaw et al. ............... 434/262 X |
| 5,833,468 * | 11/1998 | Guy et al. ......................... 434/350 X |
| 5,879,163 * | 3/1999 | Brown et al. ..................... 434/323 X |
| 6,002,915 * | 12/1999 | Shimizu ............................ 434/350 X |
| 6,020,886 * | 1/2000 | Jacober et al. ................... 434/118 X |
| 6,021,119 * | 2/2000 | Derks et al. ...................... 434/350 X |

* cited by examiner

*Primary Examiner*—Jessica J. Harrison
*Assistant Examiner*—Chanda Harris
(74) *Attorney, Agent, or Firm*—Baker Botts L.L.P.

(57) ABSTRACT

A system for establishing a data session and a voice session for training a user on a computer program includes a customer workstation coupled to a selected agent workstation by a data network and a voice network. The customer workstation generates a session request in response to user input requesting assistance regarding the computer program. The data network and the voice network establish a data session and a voice session, respectively, between the customer workstation and the selected agent workstation in response to the session request.

34 Claims, 6 Drawing Sheets

| USER NAME | USER PASSWORD | SUBSCRIBER STATUS |
|---|---|---|
| BERGER, MICHAEL | **** | Y |
| OVERHEU, ANDREW | **** | Y |
| SMITH, NATALIE | **** | Y |
| JONES, JEFF | **** | N |
| ⋮ | ⋮ | ⋮ |

*FIG. 4a*

| TELEPHONE EXTENSION | NETWORK ADDRESS |
|---|---|
| (214) 555-1053 | 10.5.4.28 |
| (214) 555-1025 | 10.7.3.21 |
| (214) 555-1024 | 10.8.4.26 |
| (214) 555-1426 | 10.3.5.23 |
| ⋮ | ⋮ |

*FIG. 4b*

| TELEPHONE EXTENSION | NETWORK ADDRESS | AGENT QUALIFICATIONS |
|---|---|---|
| (313) 555-2133 | 20.5.3.82 | MICROSOFT WORD WORDPERFECT ⋮ |
| (214) 555-2312 | 22.6.4.31 | MICROSOFT EXCEL ORACLE LOTUS 123 |
| (972) 555-2456 | 21.5.7.39 | JAVA C++ ⋮ |
| ⋮ | ⋮ | ⋮ |
| (312) 555-2134 | 20.7.9.12 | MICROSOFT WORD WORDPERFECT ⋮ |
| (512) 555-2135 | 20.9.7.32 | MICROSOFT WORD WORDPERFECT ⋮ |

*FIG. 4c*

| TELEPHONE EXTENSION | AVAILABILITY STATUS |
|---|---|
| (313) 555-2133 | BUSY |
| (214) 555-2312 | AVAILABLE |
| (972) 555-2456 | BUSY |
| ⋮ | ⋮ |
| (312) 555-2134 | BUSY |
| (512) 555-2135 | AVAILABLE |

SYSTEM AND METHOD FOR ESTABLISHING A DATA SESSION AND A VOICE SESSION FOR TRAINING A USER ON A COMPUTER PROGRAM

TECHNICAL FIELD OF THE INVENTION

The present invention relates in general to telecommunication systems and methods, and more particularly to a system and method for establishing a data session and a voice session for training a user on a computer program.

BACKGROUND OF THE INVENTION

Users of computer programs often require training or guidance to perform various tasks. Training manuals and other literature aimed at guiding a user to perform these tasks are often difficult to understand and do not always provide context-specific guidance. Help desks designed to provide guidance to the user often fail to understand the context of the user's problem and are unable to provide meaningful interactive assistance to the user since the instructor cannot see or control the user's display.

One approach to solve this problem establishes a remote control session between an instructor and the user to allow the instructor to see and control the user's display. The user then manually places a voice call to speak with the instructor. A drawback to this approach is that the user must possess the remote control software and a working knowledge of how to launch the software manually. Even if the user successfully launches the remote control software, there is often no provision for directing the remote control session to an available instructor. Furthermore, the user must possess and remember the telephone number of the appropriate instructor in order to manually place the voice call. In some cases, the user must know the network address of his computer so that the instructor may attach to and remotely control the correct user. Even if the user successfully establishes the remote control session and dials the proper telephone number, the instructor is often unaware of the specific computer program and specific task with which the user requests assistance. Finally, the instructor with whom the session is conducted may prove to be unqualified to handle the request.

SUMMARY OF THE INVENTION

In accordance with the present invention, a system and method for establishing a data session and a voice session for training a user on a computer program is provided that substantially eliminates or reduces disadvantages or problems associated with prior systems and methods.

In one embodiment of the present invention, a system for establishing a data session and a voice session for training a user on a computer program includes an agent workstation, and a customer workstation that generates a session request in response to user input requesting assistance in operating the computer program. The system further includes a data network coupled to the customer workstation and the agent workstation. The data network establishes the data session between the customer workstation and the agent workstation in response to the session request. The system further includes a voice network coupled to the customer workstation and the agent workstation. The voice network establishes the voice session between the customer workstation and the agent workstation in response to the session request.

Another embodiment of the present invention is a method for establishing a data session and a voice session for training a user on a computer program. The method includes generating a session request at a customer workstation in response to a user requesting assistance in operating a computer program. The method continues by establishing a data session between a customer workstation and an agent workstation in response to the session request. The method concludes by establishing a voice session between the customer workstation and the agent workstation in response to the session request.

Technical advantages of the present invention include a system that automatically establishes a data session and a voice session between a customer workstation and a selected agent workstation upon the activation of a help button. This eliminates the necessity of a user to launch separate remote control software applications manually and to dial the telephone number of the appropriate instructor. The system selects the agent workstation in response to status information provided by the customer workstation. In particular, the system identifies a set of agent workstations qualified to train the user on the specified computer program with which the user requests assistance, and monitors their availability to select a particular agent workstation. This enhances the data session and the voice session by providing an instructor that is available and qualified to train the user in the specified computer program.

Other technical advantages of the present invention include initiating a remote control session as a part of the data session between the customer workstation and the agent workstation. During the remote control session, the instructor may operate the customer workstation to train the user on how to perform various tasks within the specified computer program. Therefore, the instructor may provide the user with step-by-step verbal instructions over the voice network while simultaneously controlling the customer workstation. This provides the user with an interactive, step-by-step training session that allows an instructor to reinforce verbal instructions provided over the voice network with visual instructions provided over the data network. Furthermore, the system communicates relevant information to the instructor regarding the user and the task with which the user requests assistance. This allows the instructor to provide context-sensitive and user-specific training.

The system may advantageously be implemented in either a local or a global environment. For example, components of the system in a local environment may reside in the same geographic area, such as in a common classroom, training room, job site, or other common user site. Components of the system in the global environment may reside in the same or separate geographic locations. In one embodiment, components of the data network maintain a network connection over which the data session is established. This liberates the data network from having to "log-in" each user of the customer workstations as a network user of the data network. Instead, the data network performs a validation inquiry to determine whether the user is a subscriber of the system.

BRIEF DESCRIPTION OF THE DRAWINGS

For a more complete understanding of the present invention and its advantages, reference is now made to the following description taken in conjunction with the accompanying figures in which like reference numbers indicate like features and wherein.

DETAILED DESCRIPTION OF THE INVENTION

Figure 1:
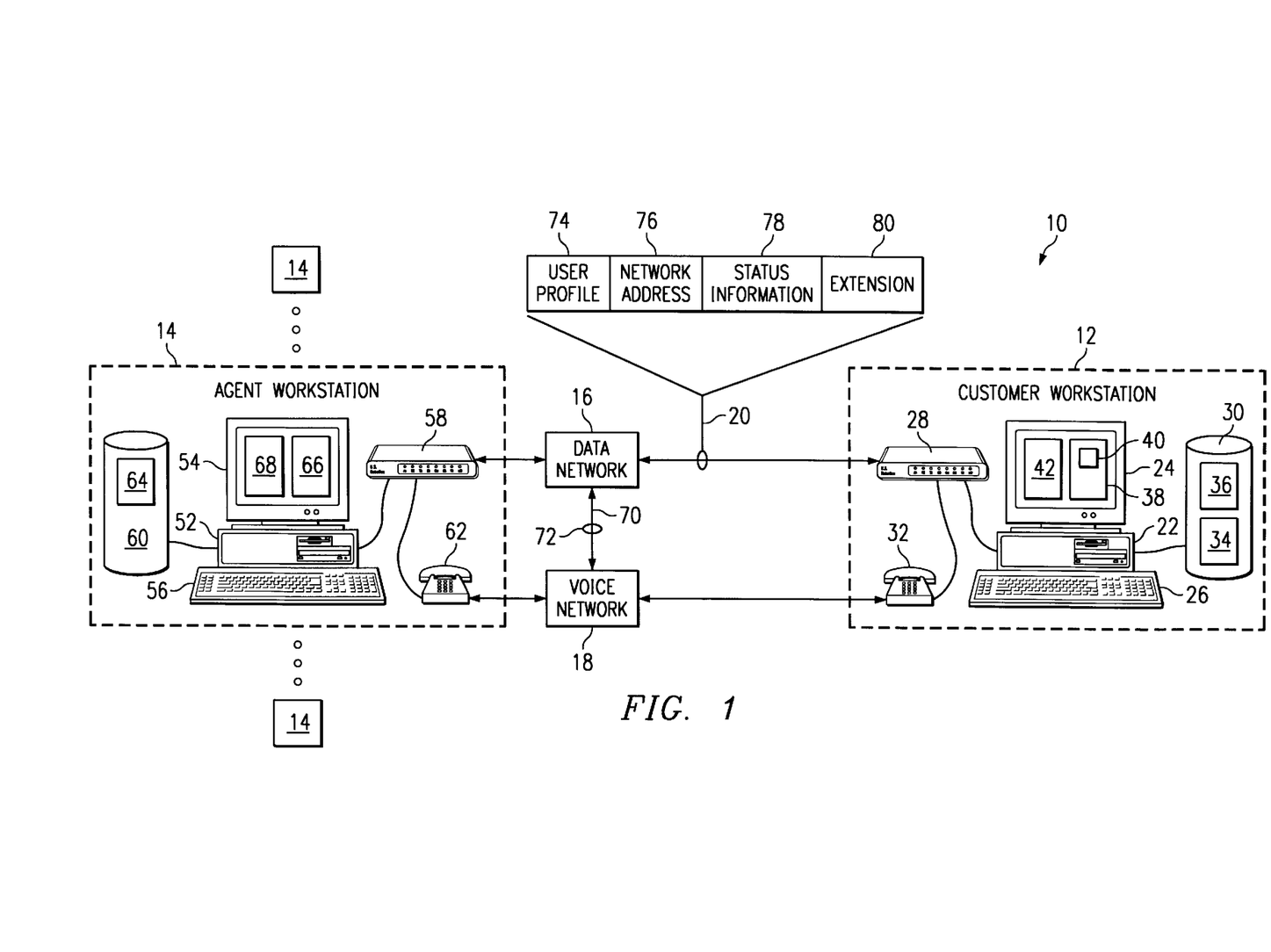
FIG. 1 illustrates a block diagram of a system for establishing a data session and a voice session for training a user on a computer program.

FIG. 1 illustrates a communications system 10 that includes a customer workstation 12 coupled to an agent workstation 14 by a data network 16 and a voice network 18. In general, customer workstation 12 generates a session request 20 in response to user input requesting assistance in operating a computer program 34. Networks 16 and 18 establish a data session and a voice session, respectively, in response to session request 20 so that an instructor at agent workstation 14 may train a user at customer workstation 12 on computer program 34.

Customer workstation 12 includes a processor 22 coupled to one or more output devices 24, such as a display or speaker, and one or more input devices 26, such as a keyboard or mouse. Workstation 12 also includes a communication interface 28, such as the appropriate hardware (e.g., one or more modems, terminal adapters, or network interface cards) and software (e.g, protocol conversion and data processing software), to communicate with data network 16 and voice network 18. A memory 30 (e.g., RAM, ROM, CD, ROM, Magnetic, Optical) stores information as files, stacks or any other suitable organization in volatile or non-volatile storage. Workstation 12 further includes a voice instrument 32, such as a telephone, to communicate with voice network 18, and any other suitable device that provides voice/data communication.

Processor 22 comprises a central processing unit associated with an operating system that executes computer program 34 and a training session application 36, stored in memory 30. Processor 22 includes the network hardware, software, and protocols to support communication interface 28, allowing application 36 to establish communications across data network 16 and voice network 18. In one embodiment, processor 22 automatically performs a resource analysis of the components of customer workstation 12, particularly communication interface 28, to determine the most appropriate communication devices with which to establish the voice and data sessions. For example, processor 22 assesses the number and type of available modems, terminal adaptors, network interface cards, or any other component of communication interface 28, to establish optimally the voice and data sessions between workstations 12 and 14. Processor 22 prompts the user to use particular communication devices in response to the resource analysis.

Computer program 34 comprises any full-featured and functioning software application in use by a user at customer workstation 12, such as WORDPERFECT, MICROSOFT WORD, MICROSOFT EXCEL, LOTUS, or any other software application the use of which may entail requesting assistance. Computer program 34 presents a graphical user interface 42 on output device 24 to allow a user at customer workstation 12 to operate program 34. Since computer program 34 is a full-featured and functioning software application, a user may use computer program 34 independent of or in conjunction with any other program, such as training session application 36.

Training session application 36 comprises a software application that initiates a voice and data session between workstations 12 and 14 to deliver assistance to the user of computer program 34. In particular, application 36 prompts the user to enter a user name and password to verify that the user is a current subscriber to system 10, as explained in detail below. Thereafter, application 36 maintains status information about the user and the user's work and progress associated with computer program 34 for inclusion in session request 20. Application 36 presents on output device 24 a training bar 38 including an icon 40, such as a help button, the activation of which automatically initiates the establishment of both a data session and a voice session between customer workstation 12 and a selected agent workstation 14.

In one embodiment, the user performs training activities directly on training session application 36. Therefore, although the following details describe a user of customer workstation 12 operating on computer program 34, it should be understood that system 10 supports training a user on application 36 as well.

Agent workstation 14 includes a processor 52 coupled to one or more output devices 54, such as a display or speaker, and one or more input devices 56, such as a keyboard or mouse. Workstation 14 also includes a communication interface 58, such as the appropriate hardware (e.g., one or more modems, terminal adapters, or network interface cards) and software (e.g, protocol conversion and data processing software) to communicate with data network 16 and voice network 18. A memory 60 (e.g., RAM, ROM, CD-ROM, Magnetic, Optical) stores information as files, stacks or any other suitable organization in volatile or non-volatile storage. Workstation 14 further includes a voice instrument 62, such as a telephone, to communicate with voice network 18, and any other suitable device that provides voice/data communication.

Processor 52 comprises a central processing unit associated with an operating system that executes a remote control application 64, stored in memory 60. Application 64 comprises any software application, such as PCANYWHERE, REACHOUT, or REMOTE DESKTOP, that allows agent workstation 14 to see and/or control the operation of customer workstation 12. In a particular embodiment, application 64 grants control of processor 22 to processor 52, to allow an instructor at agent workstation 14 to control computer program 34 running on customer workstation 12. Application 64 also displays the images appearing on output device 24 on display 66 at agent workstation 14. In addition, output device 54 displays any other full-featured and functioning computer program or software application 68 currently running on agent workstation 14 separate from application 64. By allowing an instructor at agent workstation 14 to see and/or control computer program 34 running on customer workstation 12, system 10 provides an interactive training session for the user.

Data network 16 comprises any combination of local area networks (LANs), wide area networks (WANs), global computer networks, hubs, routers, bridges, gateways, switches, servers, databases, or any other association of suitable wireline or wireless communication devices and networks, and related software, that establishes a data session between customer workstation 12 and a selected agent workstation 14 in response to session request 20. As a part of establishing the data session, data network 16 validates customer workstation 12 as a subscriber of system 10 in response to information provided in session request 20. Using a link 70, data network 16 also communicates session information 72 including, but not limited to, the telephone extensions of workstations 12 and 14, to voice network 18.

Voice network 18 comprises any combination of computer telephony interface (CTI) servers, automatic call distributors (ACD), private branch exchanges (PBX), public switched telephone networks (PSTN), integrated services digital networks (ISDN), or any other suitable communications network or switching and routing device that establishes a voice session between workstations 12 and 14 in response to session request 20, and session information 72 received from data network 16.

Session request 20 comprises one or more packets of data mapped into a network protocol, such as, for example, TCP/IP. Session request 20 includes a user profile 74, a network address 76 associated with customer workstation 12, status information 78 associated with computer program 34 and, in one embodiment, extension 80 associated with voice instrument 32, such as a telephone extension. User profile 74 includes customer specific information, such as the name and password of the user and customer preferences, such as a preferred instructor. Network address 76 comprises an Internet Protocol (IP) address, or any other suitable network address that facilitates addressing and communication with customer workstation 12 over data network 16. Status information 78 identifies computer program 34 operating on processor 22 and the specific aspect of computer program 34 with which the user requests assistance. For example, status information 78 may indicate that the user requests assistance to open a file in a particular word processing application. Status information 78 may also include previous procedures attempted or implemented by the user, current and previous error messages, a command log, a particular chapter or page within a training activity, a specific request for assistance by the user, or any other suitable information to convey activities and interaction between the user, workstation 12, and computer program 34. In one embodiment, extension 80 of voice instrument 32 is independent of network address 76 of the same customer workstation 12. This allows voice instruments 32 and processors 22 of customer workstations 12 to be interchangeable without necessitating updates to information stored in data network 16.

In operation, a user operating computer program 34 at customer workstation 12 activates help button 40 of training session application 36 indicating a request for assistance from an instructor. In a particular embodiment, the user clicks on help button 40 using a mouse point device. Upon detecting the activation of help button 40, processor 22 automatically generates and issues session request 20, thereby prompting networks 16 and 18 to establish a data session and a voice session, respectively, between workstations 12 and 14. By automatically establishing a data session and a voice session between customer workstation 12 and a selected agent workstation 14 upon the activation of help button 40, system 10 eliminates the necessity to launch separate remote control software applications manually and to dial the telephone number of the appropriate instructor. This simplifies the initiation of voice and data sessions by the user.

Referring to a more detailed description of the operation of system 10, processor 22 generates and issues session request 20 to data network 16 upon detecting the activation of help button 40. Upon receiving session request 20, data network 16 validates the user of customer workstation 12 as a subscriber of system 10. If validation is successful, data network 16 identifies the extension associated with voice instrument 32 of customer workstation 12 based upon network address 76 provided in session request 20. Alternatively, data network 16 identifies extension 80 from session request 20, if provided. Similarly, data network 16 associates status information 78 with one or more qualified agent workstations 14, and locates identifying information for that set of qualified workstations 14, such as their network addresses and telephone extensions. Determining a set of agent workstations 14 in response to status information 78 enhances the data session and the voice session by providing a qualified instructor to train the user. Data network 16 communicates the telephone extensions associated with workstations 12 and 14 to voice network 18 as session information 72.

Voice network 18 selects an available agent workstation 14 out of the set of qualified agent workstations 14. In one embodiment, voice network 18 initiates a voice call from the telephone extension of customer workstation 12 to the telephone extension of selected agent workstation 14 to establish the voice session. In another embodiment, customer workstation 12 places a voice call to voice network 18 upon detecting the activation of help button 40. In this embodiment, voice network 18 completes the voice call to the telephone extension of the selected agent workstation 14 to establish the voice session. Data network 16 establishes a data session between the selected agent workstation 14 and the customer workstation 12 that issued session request 20. It should be understood that system 10 may establish the data session and the voice session in any order without departing from the scope of the present invention. For example, data network 16 may establish the data session after the selected agent workstation 14 receives the voice call or before voice network 18 even places the voice call. Accordingly, data network 16 may also monitor the availability of qualified agent workstations 14 to select a particular agent workstation 14.

As a part of the data session, data network 16 causes remote control application 64 to establish a remote control session between workstations 12 and 14 so that an instructor can see and control workstation 12 while training the user. In particular, the remote control session grants control of processor 22, and particularly computer program 34, to an instructor at agent workstation 14 so that the instructor may provide interactive training to the user. Processor 52 displays selected contents of output device 24, including computer program 34, as display 66 on output device 54. Moreover, data network 16 provides to the instructor relevant contextual information, such as user profile 74, status information 78, or any other suitable information that would aid the instructor in training the user. The voice session allows the instructor to speak with the user while simultaneously controlling customer workstation 12. Providing simultaneous voice and data sessions, such as a voice call and a remote control session, between workstations 12 and 14 facilitates an interactive training session on computer program 34 between an instructor and a user. Communicating relevant information to the instructor regarding the user and the task with which the user requests assistance allows the instructor to provide context-sensitive and user-specific training.

Figure 2:
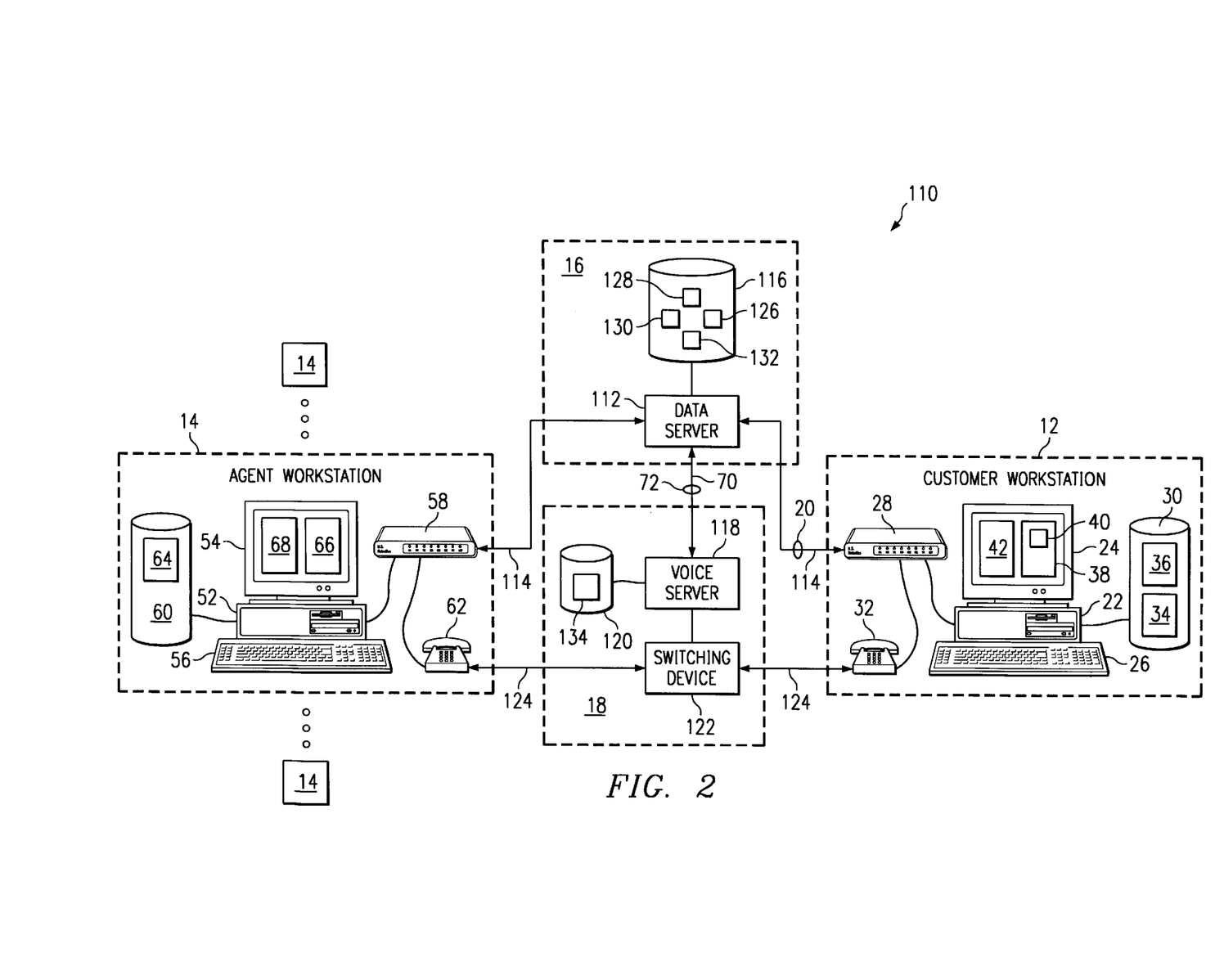
FIG. 2 illustrates a local environment for a data network and a voice network of the system.

FIG. 2 illustrates a local environment 110 for data network 16 and voice network 18 of system 10. Data network 16 includes data server 112 that couples customer workstation 12 to agent workstation 14 via data paths 114. Data network 16 further includes a memory 116 coupled to data server 112. Voice network 18 includes a voice server 118 coupled to data server 112, memory 120, and switching device 122. Memories 116 and 120 may be consolidated or distributed among or within networks 16 and 18. Switching device 122 couples voice instrument 32 of customer workstation 12 to voice instrument 62 of agent workstation 14 via voice paths 124. Components of local environment 110, including, but not limited to, customer workstation 12 and data network 16, may reside in the same geographic area, such as in a common classroom, training room, job site, or other common user site. In one embodiment, each customer workstation 12 of environment 110 maintains a permanent network address and a continuous network connection with data network 16.

Data server 112 comprises a mainframe, workstation, personal computer, or any other computing device that manages the communication and processing features of data network 16. For example, data server 112 includes sufficient hardware, software, and processing and storage capacity to receive session request 20, validate the user of customer workstation 12 as a subscriber of system 10, and, in response, establish a data session between workstations 12 and 14. Data paths 114 comprise any suitable wireline or wireless communication medium that facilitates communication between workstations 12 and 14 and data server 112. For example, data paths 114 may comprise a LAN, a WAN, a global computer network, or any other switched network or suitable communication connection. Memory 116 comprises a file, a stack, a table, or any other suitable organization of volatile or nonvolatile memory that stores a validation table 126, a user information table 128, an agent information table 130, and a session table 132.

Voice server 118 comprises a computer telephony integration (CTI) server or any other computing platform that manages the communication and processing features of voice network 18. For example, voice server 118 includes a suitable arrangement of hardware and software that allows CTI communication and voice/data support and integration between data server 112, voice server 118, and switching device 122. Memory 120 comprises any suitable organization of volatile or non-volatile memory that stores an agent availability queue 134 to identify available agent workstations 14. Switching device 122 comprises a private branch exchange (PBX), an automatic call distributor (ACD), or any other suitable telephone switching facility. Voice paths 124 couple telephones 32 and 62 and may comprise one or more PSTN or ISDN communication lines, such as, for example, individual lines, multiple lines, trunks, multiple trunks, or any other suitable collection of lines, trunks, and/or other suitable communication lines to support one or more voice paths 124.

In operation, customer workstation 12 generates and issues session request 20 in response to the activation of help button 40, as described above. Data paths 114 communicate session request 20 to data server 112. Since each customer workstation 12 of environment 110 maintains a continuous network connection with data network 16, data server 112 may avoid performing a formal network "log-in" procedure between customer workstation 12 and data network 16 in order to establish the data session. Rather, data server 112 accesses validation table 126 to determine whether the user of customer workstation 12 is a subscriber of system 10. In particular, table 126 associates the user name and user password provided in user profile 74 of session request 20 with subscriber information that identifies whether the user of customer workstation 12 is registered with and is currently provided access to system 10. If user validation is successful, data server 112 accesses user information table 128 to determine the extension associated with voice instrument 32 of customer workstation 12, such as a telephone extension. In particular, table 128 associates network address 76 of customer workstation 12 provided in session request 20 with a corresponding telephone extension so that voice network 18 may establish an appropriate voice session, as described below.

Data server 112 accesses agent information table 130 to determine the appropriate set of qualified agent workstations 14 with which to connect customer workstation 12. Table 130 associates status information 78 provided in session request 20 with a pool of qualified agent workstations 14 having corresponding telephone extensions and network addresses. For example, data server 112 processes status information 78 to identify computer program 34 and a specific task within computer program 34 with which the user requests assistance. Data server 112 accesses table 130 to associate status information 78 with one or more qualified agent workstations 14 suitable to provide user-specific and context-sensitive training to the user. Data server 112 communicates session information 72 to voice server 118, including the telephone extension of customer workstation 12 and the telephone extensions of the set of qualified agent workstations 14.

Voice server 118 accesses agent availability queue 134 to determine the next available agent workstation 14 out of the selected pool of qualified agent workstations 14. In one embodiment, voice server 118 receives a telephone extension of customer workstation 12 and accesses queue 134 to determine the availability of any agent workstation 14. Voice server 118 communicates the telephone extension of the selected agent workstation 14 using link 70. Voice server 118 communicates to switching device 122 the telephone extensions of workstations 12 and 14, respectively.

Data server 112 establishes the data session between customer workstation 12 and the selected agent workstation 14 by using data paths 114 and the network addresses of workstations 12 and 14. Specifically, data server 112 causes remote control application 64 at workstation 14 to initiate a remote control session between workstations 12 and 14. Switching device 122 establishes the voice session between voice instruments 32 and 62 by using their extensions and voice paths 124. The voice and data sessions allow an instructor at the selected agent workstation 14 to train the user on computer program 34.

Figure 3:
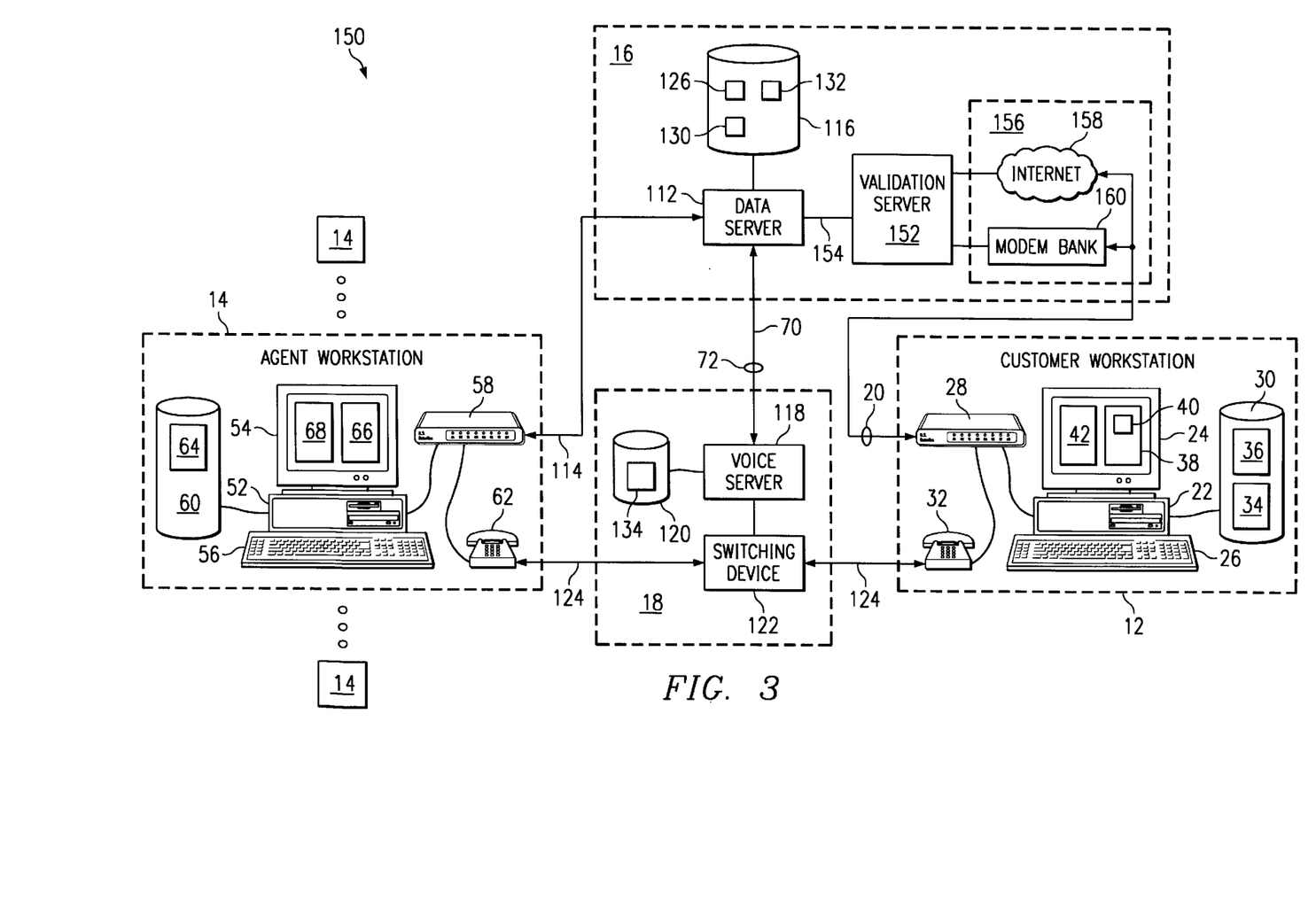
FIG. 3 illustrates a global environment for the data network and the voice network of the system.

FIG. 3 illustrates a global environment 150 for data network 16 and voice network 18 of system 10. Data network 16 includes a validation server 152 coupled to data server 112 by a network connection 154. A data path 156 couples validation server 152 to customer workstation 12. Data path 156 comprises a global computer network 158, such as the Internet, that communicates session request 20 to server 152 using a network protocol; or a remote access device 160, such as one or more modems, that communicates session request 20 to server 152 using the public switch telephone network (PSTN) or an integrated services digital network (ISDN). Either data path 114 or 156 may couple data server 112 to agent workstation 14. Data network 16 further includes memory 116 coupled to data server 112. Voice network 18 includes voice server 118 coupled to data server 112, memory 120, and switching device 122 that couples voice instrument 32 with voice instrument 62 via voice paths 124. Components of global environment 150, including, but not limited to, customer workstation 112 and data network 16, may reside in distributed geographic areas so that customer workstation 12 maintains neither a permanent network address nor a continuous network connection with data network 16. Validation server 152, however, maintains one or more continuous network connections 154 with data server 112.

Validation server 152 comprises a mainframe, workstation, personal computer, or any other computing device that manages the network validation features of data network 16. For example, validation server 152 includes sufficient hardware, software, and processing and storage capacity to maintain one or more network connections with data server 112, receive session request 20, validate the user of customer workstation 12 as a subscriber of system 10, and, in response, communicate session request 20 to data server 112.

Although data server 112, voice server 118, and validation server 152 are illustrated as distributed servers, it should be understood that servers 112, 118, and 152 may be centralized or distributed among or within networks 16 and 18. Accordingly, servers 112, 118, and 152 may each perform the communication, processing, and validation features of networks 16 and 18.

In operation, customer workstation 12 generates and issues session request 20 to data network 16 in response to the activation of help button 40. In one embodiment, activating help button 40 initiates a "log-in" procedure with an Internet Service Provider (ISP) associated with customer workstation 12. Upon completing the Internet "log-in" procedure, Internet 158 communicates session request 20 to validation server 152 in the form of TCP/IP data packets. In another embodiment, remote access devices 160 communicates session request 20 to validation server 152. By using data path 156 to couple customer workstations 12 to validation server 152, system 10 allows a user of customer workstation 12 to receive training on computer program 34 from a location remote from servers 152 and 112.

Validation server 152 accesses validation table 126 to determine whether the user of customer workstation 12 is a subscriber of system 10. Simultaneously, validation server 152 maintains one or more network connections 154 with data server 112. Upon successfully validating the user of customer workstation 12 as a subscriber of system 10, server 152 communicates session request 20 to data server 112 using one of the maintained network connections 154. By validating the user of customer workstation 12 at validation server 152 separate from data server 112, global environment 150 eliminates the need to "log-in" each user of customer workstations 12 as a network user of data server 112. Rather, validation server 152 maintains one or more multi-threaded network connections 154 with data server 112 to facilitate the requested data sessions between workstations 12 and 14. Validation server 112 may increase or decrease the number of network connections 154 it maintains with data server 112 in response to varying levels of network traffic.

Also in response to the activation of help button 40, communication interface 28 and voice instrument 32 of customer workstation 12 initiate a voice call to voice network 18, and, in response, network 18 associates the voice call to the user. In one embodiment, system 10 assigns a unique direct inward dial (DID) number to each subscriber. Upon activation of help button 40, customer workstation 12 initiates the voice call to a particular port of switching device 122 by dialing the DID number assigned to the subscriber currently using customer workstation 12. In addition to identifying the user based on user profile 74 of session request 20, system 10 may identify the user based upon the DID number dialed or using other in-band or out-of-band caller identification techniques, such as automatic number identification (ANI) techniques. In another embodiment, each customer workstation 12 initiates the voice call to a common port of switching device 22 by dialing a central telephone number. Based upon voice recognition, dual tone multifrequency (DTMF) signals, or other input, the user forwards a user name and password to voice network 18 to identify who is calling. Therefore, either by dialing a unique DID number, by dialing a central number and then forwarding the user name and password, or by other in-band or out-of-band caller identification techniques, customer workstation 12 can place a voice call to voice network 18, and, in response, network 18 can identify the user that is calling.

Data server 112 accesses agent information table 130 to determine the telephone extension of the appropriate set of qualified agent workstations 14 with which to connect customer workstation 12. Data server 112 communicates session information 72 to voice server 118, including the telephone extensions associated with the set of qualified agent workstations 14. Voice server 118 accesses queue 134 to select an available agent workstation 14 out of the pool of qualified agent workstations 14. Alternatively, data server 112 accesses session table 132 to select an available agent workstation 14 out of the pool of qualified agent workstations 14. Data server 112 establishes the data session between customer workstation 12 and the selected agent workstation 14 using the network address of each workstation 12 and 14, and data paths 114, 156, or both. As a part of the data session, data network 16 causes remote control application 64 at agent workstation 14 to establish a remote control session between workstations 12 and 14. Upon selection of a suitable agent workstation 14, switching device 122 of voice network 18 establishes the voice session between voice instruments 32 and 62 by using their extensions and voice paths 124. The instructor at the selected agent workstation 14 then proceeds with training the user of customer workstation 12, as requested.

In another embodiment of global environment 150, system 10 employs Internet telephony to establish the voice session across Internet 158. In this embodiment, workstations 12 and 14 possess the hardware and software necessary to support Internet telephony that allows users to speak with instructors across Internet 158. Specifically, system 10 uses a Voice-Over-Internet-Protocol (VOIP) to facilitate the voice session between workstations 12 and 14 through data network 16. Alternatively, system 10 may employ phone-to-phone Internet telephony that uses local dial-up numbers to route long distance voice calls over a packet-switched backbone protocol. In either embodiment, Internet 158 supports the simultaneous and duplex transmission of voice and data packets between workstations 12 and 14 across data network 16.

Figure 4A:
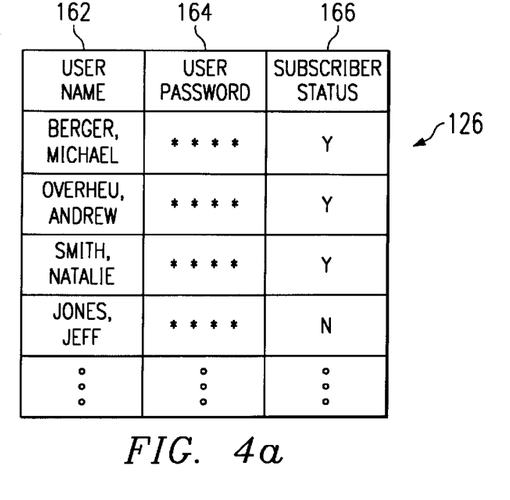
FIGS. 4a–4e illustrate exemplary tables used by the system.

FIG. 4a illustrates one embodiment of validation table 126 that includes user names 162, user passwords 164, and subscriber status 166 to identify whether a user of customer workstation 12 is a subscriber of system 10. In particular, table 126 associates a user name and password provided in user profile 74 of session request 20 with subscriber status 166 to identify whether the user of customer workstation 12 is registered with and is currently provided access to system 10. If the user name 162 and password 164 provided in user profile 74 match an entry of table 126, and the corresponding subscriber status 166 indicates that the user is a current subscriber of system 10, then networks 16 and 18 continue with establishing the data and voice sessions, respectively. If a user name 162 or password 164 does not match an entry of table 126, or the subscriber status 166 of a particular user indicates that the user is not a current subscriber of system 10, then networks 16 and 18 discontinue establishing the data and voice sessions. Data network 16 notifies the user of customer workstation 12 accordingly.

Figure 4B:
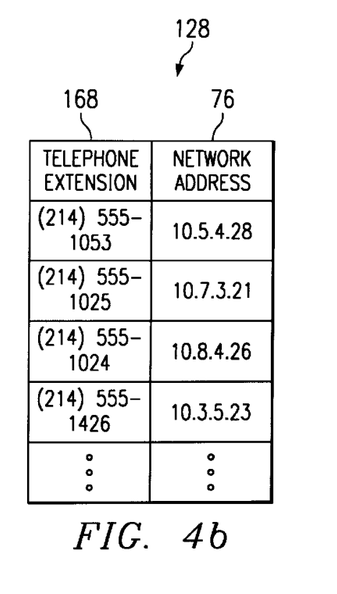

FIG. 4b illustrates one embodiment of user information table 128 that includes telephone extensions 168 and network addresses 76 of customer workstations 12. Table 128 associates a particular network address 76 provided in session request 20 with a corresponding telephone extension 168 associated with the customer workstation 12 that initiated session request 20. For example, if network address 76 provided in session request 20 is "10.3.5.23," then the corresponding telephone extension 168 for that customer workstation 12 is "(214)555-1426." System 10 uses this information to ensure that the voice and data sessions are established between the selected agent workstation 14 and telephone extension 168 and network address 76 of the same customer workstation 12.

Figure 4C:
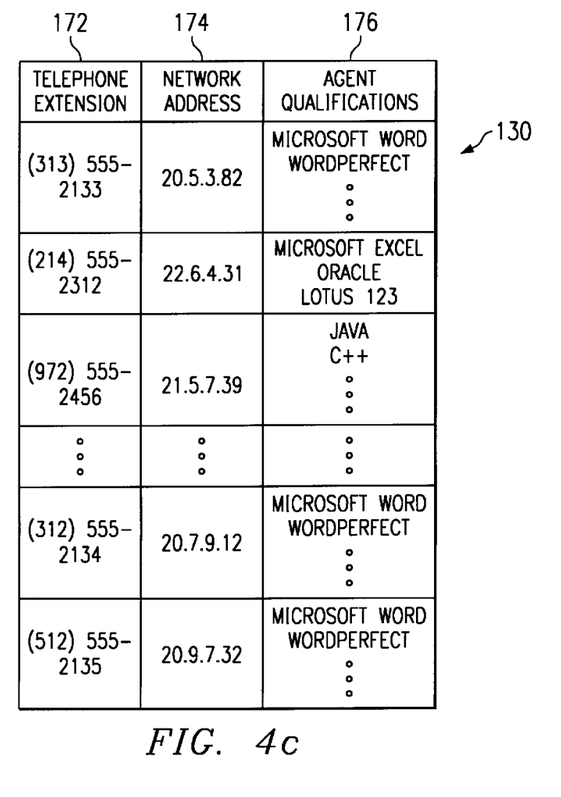

FIG. 4c illustrates one embodiment of an agent information table 130 that includes telephone extensions 172, network addresses 174, and agent qualifications 176. Table 130 associates status information 78 provided in session request 20 with one or more agent workstations 14 that are qualified to assist the user of computer program 34. For example, if status information 78 of session request 20 indicates that the user requests assistance with a word-processing application, such as MICROSOFT WORD or WORDPERFECT, then table 130 identifies telephone extensions "(313) 555-2133," "(312) 555-2134," and "(512) 555-2135," and their corresponding network addresses 174, as potential agent workstations 14 qualified to assist the user with the requested word-processing application. Agent qualifications 176 may include any combination of applications in which an instructor operating at a particular agent workstation 14 is qualified to train a user.

Figure 4D:
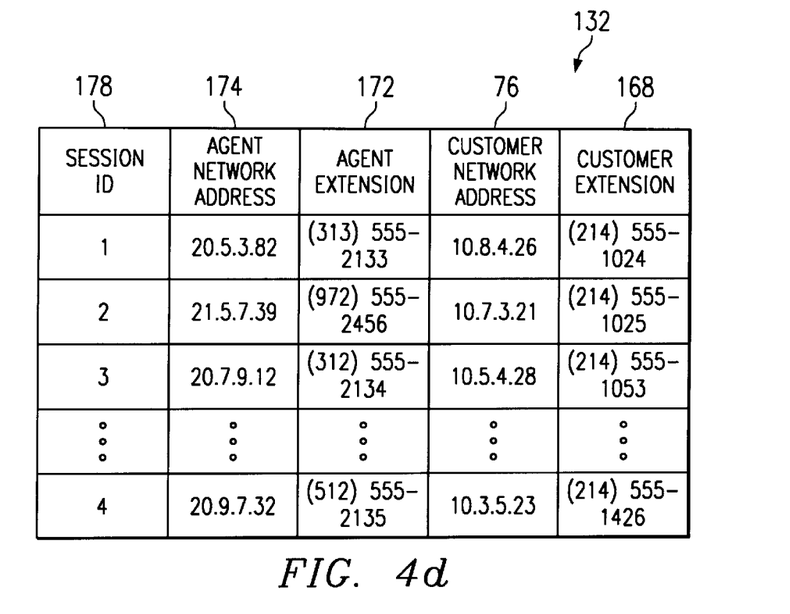

FIG. 4d illustrates one embodiment of a session table 132 that includes session IDs 178, agent network addresses 174, agent telephone extensions 172, customer network addresses 74, and customer telephone extensions 168. Session table 132 maintains an updated log of voice and data sessions between customer workstations 12 and agent workstations 14. Session ID 178 is a unique or different designator assigned to each session currently handled by networks 16 and 18. For each session ID 178, table 132 includes an agent network address 174 and an agent telephone extension 172 that represent the identifying information of the particular agent workstation 14 engaged in the identified voice or data session. Similarly, for each session ID 178, table 132 includes a customer network address 74 and customer telephone extension 168 that represent the particular customer workstation 12 engaged in the identified voice or data session. Session table 132 allows data server 112 to determine the availability of agent workstations 14 and establish the data session accordingly. Upon creation of a new session, data server 112 assigns a new session ID 178 and creates a new entry in session table 132. Upon the expiration of a session (e.g., timeout, user termination, equipment malfunction) data server 112 removes the entry in session table 132 associated with the particular session ID 178.

Figure 4E:
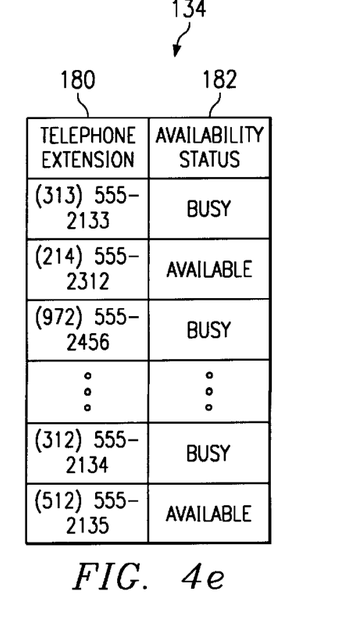

FIG. 4e illustrates one embodiment of an agent availability queue 134 that includes telephone extensions 180 and availability status 182. Queue 134 identifies a particular agent workstation 14 within the pool of qualified agent workstations 14 that is available to service customer workstation 12 at any given time. For example, if status information 78 of session request 20 indicates that the user of customer workstation 12 requests assistance with a word-processing application, as described above, then voice server 118 accesses queue 134 to determine which of telephone extensions "(313) 555-2133," "(312)555-2134," or "(512) 555-2135" is currently available to service the user. In particular, as illustrated in FIG. 4e, agent workstations 14 associated with telephone extensions "(313) 555-2133" and "(312) 555-2134" are busy and unavailable to service the user of customer workstation 12. Queue 134 indicates, however, that agent workstation 14 associated with telephone extension "(512) 555-2135" is available. Therefore, voice server 118 communicates telephone extension "(512) 555-2135" associated with the available agent workstation 14 to data server 112 and switching device 122. Voice server 118 dynamically updates availability status 182 based on the availability of agent workstations 14 at any given time. It should be understood that availability status 182 may be added as an additional column of agent information table 130 without departing from the scope of the present invention. Incorporating availability status 182 with agent information table 130 allows data network 16 to track the availability of agent workstations 14 and establish the data session accordingly.

Referring now to an exemplary operation of system 10 with regard to FIGS. 4a–4e. Data network 16 receives session request 20 indicating a user, such as "Michael Berger," an associated network address, such as "10.3.5.23," and status information 78. Data network 16 accesses table 126 to validate "Michael Berger" as a subscriber of system 10. Upon successfully validating "Michael Berger," data server 112 of local environment 110 accesses table 128 to determine telephone extension 168 of customer workstation 12 associated with network address "10.3.5.23." As illustrated in FIG. 4b, telephone extension 168 associated with "10.3.5.23" is "(214) 555-1426."

Data server 112 processes status information 78 to identify all qualified agent workstations 14. Voice server 118 determines that the agent workstation 14 associated with telephone extension "(512) 555-2135" is the only available instructor qualified to train the user in a word-processing application. Data server 112 accesses table 130 and locates network address "20.9.7.32" associated with telephone extension "(512) 555-2135" of the selected agent workstation 14. Data server 112 then establishes a data session between the network addresses of workstations 12 and 14 as specified by table 130 and session request 20. Switching device 122 receives from voice server 118 telephone extension "(512) 555-2135" indicating the selected agent workstation 14. In local environment 110, switching device 22 receives from data server 112 telephone extension "(214) 555-1426" indicating the appropriate customer workstation 12. In global environment 150, network 18 receives a voice call initiated by customer workstation 12. Switching device 122 then establishes a voice session between these telephone extensions. Data server 112 updates session table 132 to include a new entry. As illustrated in FIG. 4d, this new entry is entered with session ID 178 of "4".

Figure 5:
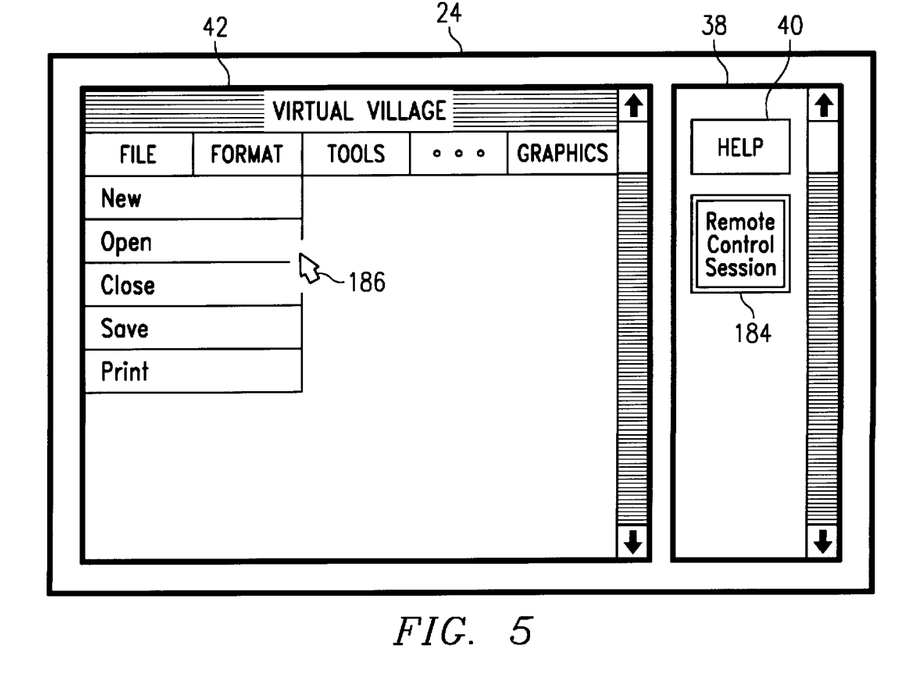
FIG. 5 illustrates an exemplary display of a customer workstation of the system.

FIG. 5 illustrates an exemplary display of customer workstation 12 that includes graphical user interface 42 of computer program 34, and training bar 38 of training session application 36. Training bar 38 includes help button 40, the activation of which generates session request 20 indicating a request for assistance with computer program 34. Training bar 38 also includes remote control session icon 184 that indicates the successful establishment of a data session, and particularly an established remote control session between workstations 12 and 14.

GUI 42 presents an arrow icon 186 that controls the functionality of computer program 34. For example, a user of computer program 34 may manipulate arrow icon 186 with a mouse, a trackball, or any other suitable input device 26 to perform various tasks within computer program 34. Upon establishing a remote control session as indicated by icon 184, an instructor at agent workstation 14 gains control of arrow icon 186 and computer program 34. The instructor may then manipulate arrow icon 186 with input device 56 at workstation 14 to train the user at workstation 12 on how to perform various tasks within computer program 34. For instance, if status information 78 indicates that the user requests assistance with opening a particular file of a word-processing application, the instructor at workstation 14 may interactively train the user to perform this task. In particular, the instructor may provide the user with step-by-step verbal instructions over voice network 18 while simultaneously controlling arrow icon 186 on output device 24 to show the user how to open a file. This provides the user with an interactive, context-sensitive training session that allows an instructor to reinforce verbal instructions provided over voice network 18 with visual instructions provided over data network 16.

Figure 6:
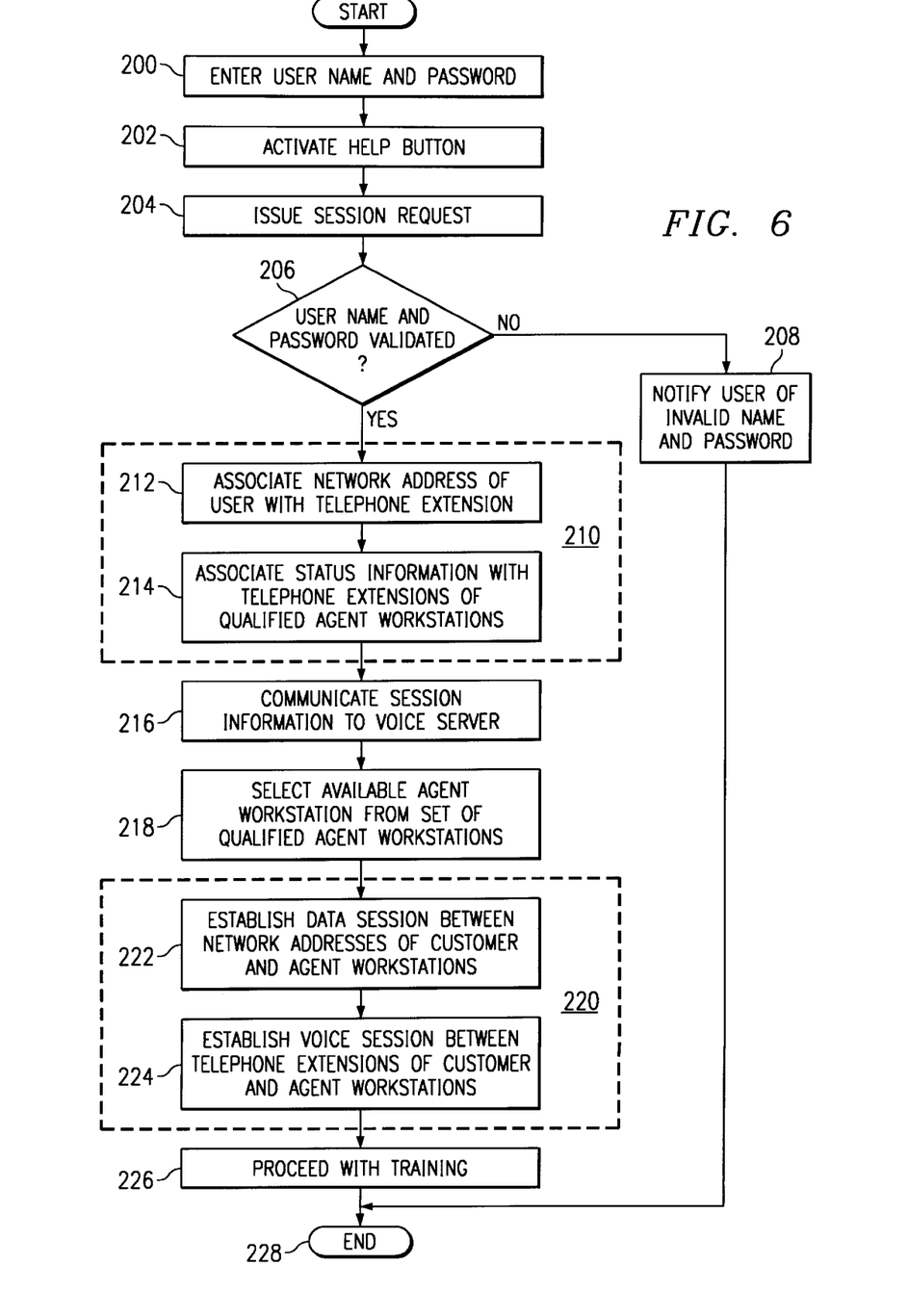
FIG. 6 illustrates an exemplary method for establishing a data session and a voice session for training a user on a computer program.

FIG. 6 is a flow chart of an exemplary method for establishing a data session and a voice session for training a user on computer program 34. A user of customer workstation 12 enters a user name and user password upon launching training session application 36, at step 200. Application 36 may run simultaneously with but separate from computer program 34. The user activates help button 40 to indicate a request for assistance from an instructor for a particular aspect of computer program 34, at step 202. Processor 22 issues a session request 20 at step 204 to initiate the establishment of a data session and a voice session between workstations 12 and 14. In local environment 110 illustrated in FIG. 2, interface 28 communicates session request 20 to data server 112 via data path 114. In remote environment 150 illustrated in FIG. 3, interface 28 communicates session request 20 to validation server 152 via data path 156, such as Internet 158 or remote access device 160.

Data network 16 determines whether the user name and user password provided in user profile 74 of session request 20 is valid, at step 206, by interrogating validation table 126. In local environment 110, data server 112 performs the validation inquiry, while in remote environment 150, validation server 152 performs the validation inquiry. If the user of customer workstation 12 is not a current subscriber to system 10, then data network 16 notifies the user accordingly at step 208. Execution then concludes at step 228.

Referring back to the validation inquiry of step 206, if the user of customer workstation 12 is a current subscriber to system 10, then execution proceeds to steps 210 where data network 16 assembles session information 72 used to establish the data and voice sessions. In particular, data server 112 of local environment 110 accesses user information table 128 at step 212 to associate network address 76 provided in session request 20 with the telephone extension associated with the customer workstation 12 that issued session request 20. Alternatively, this information may be included in session request 20. Furthermore, data server 112 accesses agent information table 130, at step 214, to identify one or more agent workstations 14 qualified to provide context-sensitive training to the user of customer workstation 12. Specifically, data server 112 associates status information 78 provided in session request 20 with a particular set of telephone extensions associated with qualified agent workstations 14 and their corresponding network addresses by interrogating fields 172, 174, and 176 of table 130. Data server 112 communicates session information 72 to voice server 118 at step 216.

Voice server 118 selects a particular agent workstation 14 from the set of qualified agent workstations 14 in response to session information 72 at step 218. In particular, voice server 118 accesses agent availability queue 134 to determine the availability of the selected set of qualified agent workstations 14 by interrogating fields 178 and 180 of table 134. Alternatively, data server 112 may select agent workstation 14 by accessing session table 132, and may communicate the selection in session information 72. Data network 16 and voice network 18 establish the data session and voice session, respectively, at steps 220. In particular, data server 112 establishes a data session between the network addresses of workstations 12 and 14 using data paths 114, 156, or both, at step 222. As a part of the data session, data network 16 causes a remote control session to be established between workstations 12 and 14. Switching device 122 establishes a voice session between telephones 32 and 62 using their extensions and voice paths 124. The instructor of the selected agent workstation 14 proceeds with training the user of customer workstation 12 on computer program 34, at step 226. The method concludes at step 228.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A system for establishing a data session and a voice session for training a user on a computer program, comprising:

a customer workstation operable to execute the computer program and to generate a session request in response to user input requesting assistance in operating the computer program;

an agent workstation operated by an instructor to train the user on the computer program;

a data network coupled to the customer workstation and the agent workstation, the data network operable to establish the data session between the customer workstation and the agent workstation in response to the session request; and a voice network coupled to the customer workstation and the agent workstation, the voice network operable to establish the voice session between the customer workstation and the agent workstation in response to the session request.

2. The system of claim 1, wherein the customer workstation comprises:

a processor operable to execute the computer program and a training session application;

an output device operable to display the computer program and an activation area associated with the training session application;

a communication device operable to communicate using the data network; and a voice instrument operable to communicate using the voice network.

3. The system of claim 2, wherein the activation area comprises a help button the activation of which initiates the generation of the session request.

4. The system of claim 1, wherein the session request comprises:
   a user profile;
   a network address associated with the customer workstation; and
   status information associated with the computer program.

5. The system of claim 4, wherein the status information identifies the computer program and a task associated with the computer program with which the user requests assistance.

6. The system of claim 1, wherein the agent workstation initiates a remote control session with the customer workstation in response to the establishment of the data session, and the agent workstation is operable to control the customer workstation remote from the customer workstation during the remote control session.

7. The system of claim 1, wherein the agent workstation comprises:
   a communication device operable to communicate using the data network;
   a voice instrument operable to communicate using the voice network;
   a processor operable to control the customer workstation remote from the customer workstation during the data session; and
   an output device coupled to the processor and operable to display the images appearing on the customer workstation during the data session.

8. The system of claim 1, wherein the data network comprises:
   a memory that stores session information associating the customer workstation with a plurality of agent workstations; and
   a server coupled to the memory and operable to establish a network connection with the customer workstation in response to validating the user as a subscriber of the system.

9. The system of claim 8, wherein the session information comprises:
   a telephone extension associated with the customer workstation;
   a plurality of telephone extensions associated with the plurality of agent workstations; and
   a plurality of network addresses associated with the plurality of agent workstations.

10. The system of claim 8, wherein the voice network comprises:
    a voice server coupled to the data network and operable to select a particular agent workstation in response to the session request; and
    a switching device coupled to the voice server and operable to establish the voice session between the customer workstation and the selected agent workstation using the session information.

11. The system of claim 10, wherein the voice network further comprises a memory operable to store an availability queue that identifies the availability of the plurality of agent workstations, and wherein the voice server is further operable to select a particular agent workstation using the availability queue.

12. A method for establishing a data session and a voice session for training a user on a computer program, comprising:
    receiving a session request communicated by a customer workstation that is executing the computer program, in response to a user requesting assistance in operating the computer program;
    selecting one of a plurality of agent workstations in response to the session request;
    establishing a data session between the customer workstation and the selected agent workstation; and
    establishing a voice session between the customer workstation and the selected agent workstation.

13. The method of claim 12, wherein the session request is generated by activating a help button displayed at the customer workstation.

14. The method of claim 12, wherein the steps of establishing are performed without intervention from the user.

15. The method of claim 12, further comprising:
    initiating a remote control session between the selected agent workstation and the customer workstation in response to establishing the data session; and
    controlling the customer workstation remote from the customer workstation during the remote control session.

16. The method of claim 12, wherein the customer workstation comprises:
    a processor operable to execute the computer program and a training session application;
    an output device operable to display the computer program and an activation area associated with the training session application;
    a communication device operable to communicate the session request using a data network; and
    a voice instrument operable to communicate using [the] a voice network.

17. The method of claim 16, wherein the activation area comprises a help button that enables a user to request assistance in operating the computer program.

18. The method of claim 12, wherein the session request comprises:
    a user profile;
    a network address associated with the customer workstation; and
    status information associated with the computer program.

19. The method of claim 18, wherein the status information identifies the computer program and a task associated with the computer program with which the user requests assistance.

20. The method of claim 12, wherein the step of establishing a data session further comprises:
    storing session information associating the customer workstation with the selected agent workstation;
    validating the user as a subscriber of the system; and
    establishing the data session between the customer workstation and the selected agent workstation based upon the session information and the session request.

21. The method of claim 20, wherein the session information comprises:
    a telephone extension associated with the customer workstation;
    a telephone extension associated with the selected agent workstation; and
    a network address associated with the selected agent workstation.

22. The method of claim 21 wherein the step of establishing a voice session further comprises:
    receiving the session information at a switching device; and establishing a voice call between the customer workstation and the selected agent workstation using the session information.

23. The method of claim 12, wherein the step of selecting comprises selecting the particular agent workstation based upon information that identifies the availability of the plurality of agent workstations.

24. The method of claim 12, wherein the step of selecting comprises selecting the particular agent workstation based upon information that identifies the qualifications of the plurality of agent workstations.

25. A system for establishing a voice session and a data session for training a user on a computer program, comprising:
- a customer workstation operable to execute the computer program and to generate a session request in response to user input requesting assistance in operating the computer program;
- a plurality of agent workstations;
- a validation server coupled to the customer workstation, the validation server operable to validate the user as a subscriber of the system in response to the session request;
- a data server operable to maintain a connection with the validation server, the data server further operable to store session information associated with the session request;
- a voice server coupled to the data server and operable to select a particular agent workstation in response to the session request; and
- a switching device coupled to the voice server, the switching device operable to establish the voice session between the customer workstation and the selected agent workstation;
- wherein the data server is further operable to establish the data session between the customer workstation and the selected agent workstation.

26. The system of claim 25, wherein the customer workstation comprises:
- a processor operable to execute the computer program and a training session application;
- an output device operable to display the computer program and an activation area associated with the training session application;
- a communication device operable to communicate the session request to the data server; and
- a voice instrument operable to communicate with the switching device.

27. The system of claim 26, wherein the activation area comprises a help button the activation of which initiates the generation of the session request.

28. The system of claim 25, wherein the session request comprises:
- a user profile;
- a network address associated with the customer workstation; and
- status information associated with the computer program.

29. The system of claim 28, wherein the status information identifies the computer program and a task associated with the computer program with which the user requests assistance.

30. The system of claim 25, wherein the agent workstation initiates a remote control session with the customer workstation in response to the establishment of the data session, and the agent workstation is operable to control the customer workstation remote from the customer workstation during the remote control session.

31. The system of claim 25, wherein the agent workstation comprises:
- a communication device operable to communicate with the data server;
- a voice instrument operable to communicate with the switching device;
- a processor operable to control the customer workstation remote from the customer workstation during the data session; and
- an output device coupled to the processor and operable to display images appearing on the customer workstation during the data session.

32. The system of claim 25, wherein the session information comprises:
- a telephone extension associated with the customer workstation;
- a plurality of telephone extensions associated with a plurality of agent workstations; and
- a plurality of network addresses associated with the plurality of agent workstations.

33. The system of claim 25, further comprising a memory coupled to the voice server and operable to store an availability queue that identifies the availability of the plurality of agent workstations, wherein the voice server is further operable to select the particular agent workstation using the availability queue.

34. The system of claim 25, wherein the voice server is further operable to identify the user using automatic number identification techniques.

* * * * *